Patented July 24, 1934

1,967,421

UNITED STATES PATENT OFFICE 1,967,421

PLASTIC MASS CONTAINING CELLULOSE ESTERS

Richard Müller, Mannheim, and Alfred Lübke, Mannheim-Waldhof, Germany, assignors to C. F. Boehringer & Soehne G. m. b. H., Mannheim-Waldhof, Germany No Drawing. Application April 19, 1932, Serial No. 606,280. In Germany April 24, 1931

6 Claims. (Cl. 106—40)

Our invention relates to plastic compositions produced from and containing cellulose esters and more especially to masses of this kind having particularly favourable properties.

The term "plastic composition" as used in this specification and the claims appended to it is intended to include all kinds of artificial products obtainable by incorporating in cellulose esters gelatinizing and/or softening agents, such products being so-called plastic masses and articles, such as blocks, plates, slabs, tubes and panes producible therefrom as well as artificial threads, films, lacquers etc.

As is well known to those skilled in the art cellulose esters such as the cellulose acetates require as a rule the incorporation of gelatinizing and/or softening agents, but agents of this kind, which are fully efficient and at the same time colourless, odourless, air- and lightproof, are few and far between. This is particularly true with regard to gelatinizers and softeners for primary cellulose acetates, the so-called cellulose triacetates.

We have now found that cellulose esters in general and cellulose acetates including the triacetates in particular are very favourably influenced by the addition, as gelatinizers and softeners, of the monohydroxy-diphenyl methanes (the 2-hydroxy-diphenyl methane and the 4-hydroxy-diphenyl methane) and their higher homologs having the formula

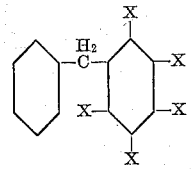

wherein one X is hydroxyl, while the others are hydrogen or alkyl. These compounds have been found not only to possess excellent gelatinizing properties, quite especially in the case of cellulose triacetates, but to also be colourless, odourless and air- and lightproof. Further these compounds do not attack iron.

The higher homologs of the hydroxy-diphenyl methanes with regard to the benzene nucleus, to which the hydroxyl group is linked, such as for instance the phenyl cresyl methane, display similar properties.

The hydroxy-diphenyl methanes are produced in two ways, either by acting with benzyl chloride on phenol in the presence of anhydrous zinc chloride (Annalen der Chemie 334, p. 373) or by adding metallic sodium to a mixture of dry toluene and phenol, thereafter admixing to the hot mixture benzyl chloride, removing the toluene, shaking with caustic soda and separating the hydroxy-diphenyl methane by the addition of acid (Annalen der Chemie 442, p. 238). In the first case a mixture of o- and p-hydroxy-diphenyl methane, after the last mentioned method almost exclusively o-hydroxy-diphenyl methane is obtained.

We prefer using the hydroxy-diphenyl methanes or their higher homologs or mixtures thereof in pure form, because, if impurities are present, they are less lightproof.

In a similar manner the homologous phenyl cresyl methanes (benzyl cresols) are obtained from cresols. According to the position of the substituent groups they are solid or liquid compounds boiling between 150 and 160° C. at 2–3 mms. mercury column. They form a mixture of isomeric compounds, which can be separated only with difficulty, but need not be separated at all for the present purpose.

The phenols, which have already been suggested for use as camphor substituents for cellulose acetates, are altogether unsuitable for use in the production of plastic masses in view of their liability to decompose, their low resistivity against the action of air and light and their smell. That the hydroxy-diphenyl methanes display such a great resistivity and such excellent gelatinizing properties is particularly surprising in view of the fact that they also contain phenolic hydroxyl groups.

In practising our invention we may for instance proceed as follows:

Example 1

100 parts by weight of the so-called celulose triacetate are mixed with 500 parts of a suitable solvent, for instance methylene chloride, and 50 parts 2- or 4-hydroxy-diphenyl methane or a mixture thereof and the mixture is then acted upon in a well known manner for the production of plastic masses including films, artificial silk etc.

Example 2

100 parts of the so-called celulose triacetate are mixed with 30–60 parts hydroxy-diphenyl methane or benzyl cresol. If desired a dyestuff is added and the intimate mixture is kneaded and gelatinized on a heated cylinder. After cooling down the mass is comminuted and acted upon further in pressure moulds as usual.

*Example 3*

100 parts cellulose diacetate are dissolved, together with 50 parts hydroxy-diphenyl methane or benzyl cresol, in 500-700 parts of a suitable solvent, for instance acetone. The solution is filtered and films are produced therefrom in the usual manner, for instance by pouring on glass plates.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

We claim:—

1. A plastic composition being a mixture of a cellulose ester and a compound being a plasticizer for the cellulose ester and having the formula

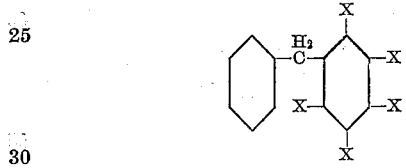

wherein one X is hydroxyl, while the others are hydrogen or alkyl.

2. A plastic composition being a mixture of a cellulose ester and different compounds being plasticizers for the ester and having the formula

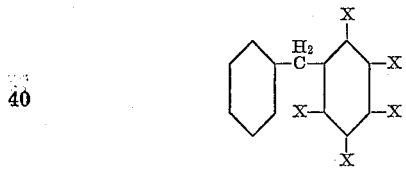

wherein one X is hydroxyl, while the others are hydrogen or alkyl.

3. A plastic composition being a mixture of a cellulose ester and benzyl cresol.

4. A plastic composition being a mixture of a cellulose acetate and a compound being a plasticizer for the cellulose ester and having the formula

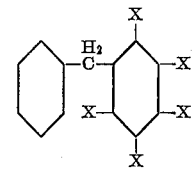

wherein one X is hydroxyl, while the others are hydrogen or alkyl.

5. A plastic composition being a mixture of cellulose diacetate and a compound being a plasticizer for the cellulose ester and having the formula

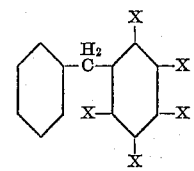

wherein one X is hydroxyl, while the others are hydrogen or alkyl.

6. A plastic composition being a mixture of cellulose triacetate and a compound being a plasticizer for the cellulose ester and having the formula

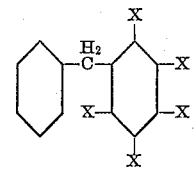

wherein one X is hydroxyl, while the others are hydrogen or alkyl.

RICHARD MÜLLER.
ALFRED LÜBKE.